July 15, 1952     B. F. SPRAGUE     2,602,998
TOOL FOR REMOVING PARTIAL DENTURES
Filed Feb. 20, 1950
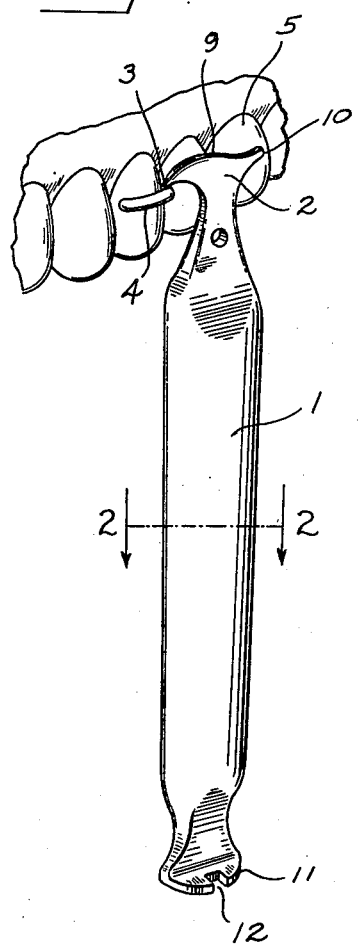
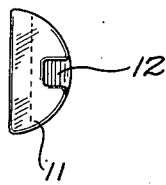
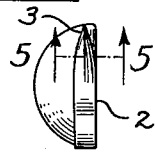
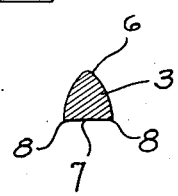
INVENTOR.
Boyd F. Sprague
BY
Atty.

Patented July 15, 1952

2,602,998

UNITED STATES PATENT OFFICE 2,602,998

TOOL FOR REMOVING PARTIAL DENTURES

Boyd F. Sprague, Klamath Falls, Oreg.

Application February 20, 1950, Serial No. 145,275

3 Claims. (Cl. 32—40)

My invention relates to dental tools or instruments, and has for its particular object the provision of a tool which may be used safely and easily to remove partial dentures or removable bridges from the mouth. At the present time, it is common to do this digitally because tools might mar or scratch the faces of said appliances, or scratch the enamel of the teeth to which they are secured. It is essential that the clasps or engaging devices fit tightly into position, and if the dentist or patient tries to force them when removing them, it may distort or loosen the clasps to such a point that much of the efficiency is lost. It is common practice, thus, to use the fingernails, which are not suitable for this purpose, particularly fingernails that are short and tender or those that are extremely long and might easily become broken.

I attain this object by providing an elongated tool having a relatively stout handle, and form the ends thereof into relatively thin flat sections terminating in lateral projections, which may be formed to engage typical surfaces; that is to say, said terminal portions may conform to projecting portions of said bridges or dentures so as to engage the latter and to provide a secure engagement therewith so that said bridges or partial dentures may be pulled directly from place without canting or twisting.

A further and more specific object of my invention is to form a tool of this character from plastic or similar material which is harder than tartar deposits but softer than tooth enamel or the material of which said dentures or removable bridges are made. This permits said tool, and particularly the pointed engaging ends thereof, to move into position between teeth, loosen and remove said tartar substances, and thus permit the tool to be more usable in pulling the appliances from position.

Further and other details of my invention are hereinafter described with reference to the accompanying drawings, in which:

Fig. 1 is a perspective view of a tool embodying my invention, shown engaging the clasp of a removable bridge in a patient's mouth in typical fashion, the latter being shown only fragmentarily;

Fig. 2 is a cross sectional view through the elongated handle of my tool, said section being taken along the line 2—2 in Fig. 1;

Fig. 3 is an end view of the lower end of the tool as illustrated in Fig. 1, showing the conformation thereof;

Fig. 4 is an end view of the opposite end of said tool, that is the upper end as viewed in Fig. 1; and Fig. 5 is a sectional view taken on the line 5—5 as in Fig. 4.

A dental tool embodying my invention preferably is made of plastic or similar material, and comprises an elongated handle 1 of generally semi-cylindrical form. Said handle is of heavy section and is thus quite stiff. One end is flattened and is formed into a lateral flange 2, resembling a bird's beak. One point 3 is turned down, as is viewed in Fig. 1, to provide a hook-like engaging element for insertion under a clasp 4 of a removable bridge 5. As is shown in section in Fig. 5, the upper portion 6 of said point terminates in a more or less sharp ridge, and the under surface 7 is provided with two relatively sharp corners 8. If said point is arranged normal to the gum and arranged to project between the adjacent faces of two adjoining teeth, it will conform to the faces thereof and the point will project substantially between said teeth. The sharp corners 8 may be used to scrape or pull tartar deposits from said surfaces. This is particularly useful if tartar deposits tend to form beneath said clasps and said deposits tend to present roughened surfaces over which the clasps would not slide easily, or would tend to prevent said clasps from being pulled smoothly and directly from said teeth. The upper surface 9 from said point 3 towards the other lateral projection or end 10 is formed upon an ogee curve and said lateral projection 10 terminates in a joint which extends upwardly. This serves as a projection for aiding in pushing bridges or dentures into place, or if the handle is reversed to the position shown in Fig. 9, to serve as a pushing agency for aiding in the removal of bridges or partial dentures. The ogee shape of said lateral flange also provides an effective lever action for aiding in the removal of bridges which do not yield readily to direct pulling action.

The other end of said handle terminates in a lateral flange 11, which has a semi-circular sweep conforming generally to the semi-circular form of the remainder of said handle. I preferably form a notch 12 centrally in said flange 11 so that said flange may straddle a clasp or other projection to provide a straddling engagement over or about said clasp, which may fit into the notch 12.

The handle is of semi-cylindrical form so that it will fit with its rounded periphery engaged by the encircling fingers and thumb and with the flat side adapted for engagement by the index finger. This is comfortable and permits substantial pressure to be exerted without discomfort and without permitting the tool to rotate about its longitudinal axis. The reason that I deem it important to have the sweep of the lateral flange coincide more or less with that of the body is that it will not dig into the user's hand when the uper end, as shown in Fig. 1, is used. If the lateral flange 11 projected beyond the sweep of the body, it would provide a relatively sharp but curved surface which would be uncomfortable, while if it were smaller than the sweep of the handle 1, it would diminish the effective overall length of said handle, particularly when it is used as a pry.

I preferably make this tool integral and of uniform hardness throughout. It preferably is made of one of the plastics which is softer than acrylic or phenolic resins, of which dentures are usually made. The reason that I select a material of this hardness is that it is harder than tartar deposits and softer than tooth enamel or said acrylic or phenolic resins. This permits the tool to be used without injuring the surfaces of the teeth or the surfaces of bridges or removable dentures.

It also makes the instrument usable in removing tartar deposits generally. Any person without technical experience is thus able to pull or scrape said deposits from between teeth without injury to the gums or without injury to the tooth enamel or dental structure. Such tool would not supplant periodic prophylaxis, but it is designed to remove or scrape tartar deposits from the teeth as an adjunct to brushing the teeth and the use of dental floss. Many people have excessive deposits of tartar or calculus formed on their teeth and seem to find it difficult to keep such deposits eliminated, even for such short periods as a few weeks or a month or so after visiting the dentist and receiving a thorough prophylaxis. Said tool thus not only is usable as a retracting tool for bridges and dentures, but also as a device usable in home care and to promote better dental health.

I claim:

1. A dental tool for aid in removing partial dentures and removable bridges, said tool comprising an elongated stiff handle, said handle terminating in an engaging end having a flat section which is thinner than said handle, said engaging end terminating in a lateral projection having a sharp point for insertion under and to engage said dentures or bridges so that they can be pulled from seated position in the mouth, said sharpened point being formed of a plastic material softer than acrylic and phenolic resins but harder than tartar deposits to prevent inadvertent damage to said dentures or removable bridges.

2. A dental tool for aid in removing partial dentures and removable bridges, said tool comprising an elongated stiff handle of semi-cylindrical form, an engaging end integral with said stiff handle but having a more thin flat section, the plane of said flat section being parallel the plane of the flat side of said semi-cylindrical handle, said engaging end terminating in a lateral projection having a sharp point for insertion under and to engage said dentures or bridges so that they can be pulled from seated position in the mouth.

3. A dental tool, comprising an elongated stiff handle of semi-cylindrical form, said handle terminating in an integral engaging end having a flat section which is more thin than said semi-cylindrical form, the plane of said flat section being parallel the plane of the flat side of said semi-cylindrical handle, said engaging end being elongated laterally to define a lateral axis perpendicular to the axis of the elongated handle and terminating in two lateral projections, both of said lateral projections being curved on a sweep from said lateral axis and at least one of said lateral projections terminating in a sharp point.

BOYD F. SPRAGUE.

REFERENCES CITED

The following references are of record in the file of this patent:

UNITED STATES PATENTS

| Number | Name | Date |
|---|---|---|
| 336,781 | Barlow | Feb. 23, 1886 |
| 739,333 | Miles | Sept. 22, 1903 |
| 938,640 | Chott | Nov. 2, 1909 |